(12) United States Patent
Scotton et al.

(10) Patent No.: US 11,422,018 B2  
(45) Date of Patent: *Aug. 23, 2022

(54) MEASURED DOSE DISPENSER AND METHODS OF USING THE SAME

(71) Applicant: Silgan Dispensing Systems Corporation, Grandview, MO (US)

(72) Inventors: James E. Scotton, Foxboro, MA (US); Clifford W. Skillin, Blackstone, MA (US); Brandon L. Ramsuer, Henrico, VA (US); William Driskell, Kansas City, MO (US)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/259,099

(22) PCT Filed: Jul. 8, 2019

(86) PCT No.: PCT/US2019/040797  
§ 371 (c)(1),  
(2) Date: Jan. 8, 2021

(87) PCT Pub. No.: WO2020/014120  
PCT Pub. Date: Jan. 16, 2020

(65) Prior Publication Data  
US 2021/0325226 A1    Oct. 21, 2021

Related U.S. Application Data

(63) Continuation of application No. 16/031,566, filed on Jul. 10, 2018, now Pat. No. 10,488,242.

(51) Int. Cl.  
*G01F 11/26* (2006.01)  
*G01F 11/28* (2006.01)  
(Continued)

(52) U.S. Cl.  
CPC .......... *G01F 11/262* (2013.01); *B05B 11/047* (2013.01); *B65D 41/26* (2013.01);  
(Continued)

(58) Field of Classification Search  
CPC ...... G01F 11/262; G01F 11/28; G01F 11/286; G01F 11/288; G01F 11/32; B05B 11/047;  
(Continued)

(56) References Cited

U.S. PATENT DOCUMENTS

| | | | |
|---|---|---|---|
| 4,077,547 A | 9/1978 | Donoghue | |
| 4,607,762 A * | 8/1986 | Zulauf | B65D 1/323 222/48 |

(Continued)

FOREIGN PATENT DOCUMENTS

| | | |
|---|---|---|
| DE | 3416882 A1 | 11/1985 |
| WO | 9728048 A2 | 8/1997 |

OTHER PUBLICATIONS

EP Appl. 19834617.3-1001/3821209—PCT Appl. PCT/US2019/040797, Extended European Search Report dated Jul. 26, 2021.

*Primary Examiner* — Frederick C Nicolas  
(74) *Attorney, Agent, or Firm* — Barlow, Josephs & Holmes, Ltd.; Stephen J. Holmes

(57) ABSTRACT

A two-piece measured-dose dispensing closure (10) includes a cup-shaped measuring chamber (12) and a rotatable dispensing control lid (14). In use, the dispensing control lid is axially moved relative to the measuring chamber by rotation between a first closed position, a second intermediate dispensing position, and a third drain position.

10 Claims, 5 Drawing Sheets

(51) Int. Cl.
  *B05B 11/04* (2006.01)
  *B65D 83/04* (2006.01)
  *G01F 11/32* (2006.01)
  *B65D 47/40* (2006.01)
  *B65D 47/26* (2006.01)
  *B65D 41/26* (2006.01)

(52) U.S. Cl.
  CPC ........... *B65D 47/263* (2013.01); *B65D 47/40* (2013.01); *B65D 83/0454* (2013.01); *G01F 11/32* (2013.01); *B05B 11/043* (2013.01); *B65D 2583/0409* (2013.01); *G01F 11/28* (2013.01); *G01F 11/286* (2013.01); *G01F 11/288* (2013.01)

(58) Field of Classification Search
  CPC .............. B05B 11/043; B65D 83/0454; B65D 2583/0409; B65D 41/26; B65D 47/263; B65D 47/40
  See application file for complete search history.

(56) References Cited

U.S. PATENT DOCUMENTS

| | | | |
|---|---|---|---|
| 4,886,193 A | 12/1989 | Wassilieff | |
| 5,261,569 A * | 11/1993 | Sandwell | G01F 11/286 |
| | | | 222/158 |
| 5,330,081 A | 7/1994 | Davenport | |
| 5,833,124 A | 11/1998 | Groves et al. | |
| 6,330,960 B1 | 12/2001 | Faughey et al. | |
| 6,923,344 B1 | 8/2005 | Chien | |
| 7,097,071 B2 | 8/2006 | Anderson et al. | |
| 9,120,112 B2 | 9/2015 | Wegener | |
| 10,488,242 B1 * | 11/2019 | Scotton | B05B 11/047 |
| 2014/0224827 A1 | 8/2014 | Szekely et al. | |

* cited by examiner

MEASURED DOSE DISPENSER AND METHODS OF USING THE SAME

BACKGROUND OF THE DISCLOSURE

Embodiments of the invention relate to dispensing devices for flowable products such as personal care products, concentrated beverages, food products, home and garden chemicals, home cleaning products, laundry products, healthcare products, etc.

Integrated dispensing containers and closures are now prevalent in a variety of industries. Consumers continually drive the need for novel dispensing devices which provide more functionality and better dispensing options for a variety of products.

SUMMARY OF THE INVENTION

Certain embodiments of the present invention are directed to a novel two-piece dispensing closure for dispensing a measured dose of a flowable product from a squeeze type container. An exemplary embodiment of the dispensing closure for dispensing a fixed volume or dose of flowable products comprises a cup-shaped measuring chamber and a rotatable dispensing control lid.

The measuring chamber includes a bottom wall and an outer side wall, a drain well in the bottom wall, and a tubular dispensing stem extending upward from the drain well. The dispensing stem has a dispensing orifice at an upper end thereof. The measuring chamber further includes a dip tube receptacle extending downwardly from the drain well, a slotted guide wall extending upward from the bottom wall surrounding the drain well, a plurality of drain ports in the bottom of the drain well and a threaded skirt wall extending downward from the bottom wall for attachment to a product container.

The dispensing control lid includes a contoured upper wall, a sealing plug extending down from the upper wall, a tubular guide stem extending downwardly from the upper wall surrounding the sealing plug and a drain well seal at a terminal lower end of the guide stem. The guide stem and the guide wall are cooperatively threaded and rotatably interact for guided axial movement of the dispensing control lid relative to the measuring chamber.

In use, the dispensing control lid is axially moved relative to the measuring chamber by rotation between a first closed position, a second intermediate dispensing position, and a third drain position.

In the closed position, the dispensing lid is fully rotated down into the measuring chamber where the sealing plug is inserted into and closes the dispensing orifice and the drain well seal is seated between the drain well wall and the dispensing stem to close the drain well.

In the intermediate dispensing or filling fill position, the dispensing control lid is rotated such that the sealing plug is axially moved upward so that it is spaced from the dispensing orifice for filling the measuring chamber. The drain well seal is slightly axially longer so that is remains engaged with the drain well and still closes the drain well. In this regard, when the product container is squeezed, product flows up through the dispensing stem and can fill the measuring chamber. The measuring chamber may be transparent or translucent and can include measurement markings so that the user can squeeze product until a desired dose is contained in the measuring chamber. The user may dispense the product by pouring from the pour spout.

In the drain position the dispensing control lid is further rotated, moving the drain seal further upward to disengage the drain well seal from the drain well, allowing product to flow into the drain well, through the drain ports and back into the product container.

In some embodiments, the dispensing closure may include a tamper evident tab connected to the lid by frangible elements. Still other embodiments may include rotation stops to locate the dispensing control lid in the fully closed position and the fully open or drain position.

Another exemplary embodiment of the dispensing closure may include a push-pull version where the dispensing control lid is axially slidable relative to the measuring chamber between the three different positions.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

Figure 1:
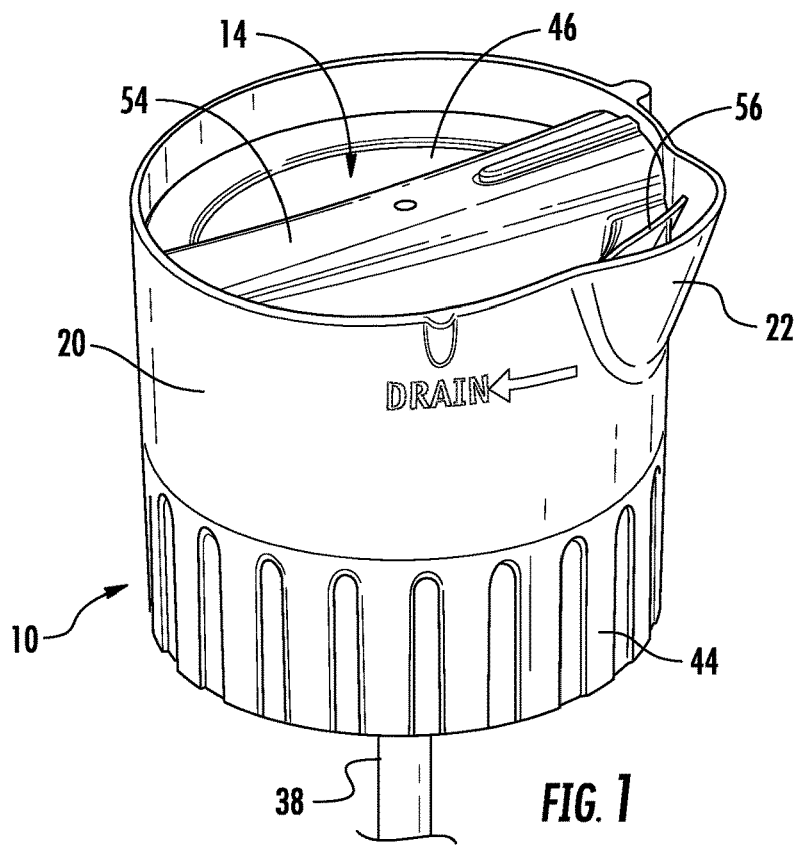
FIG. 1 is a perspective view of an exemplary configuration of a measured dose dispensing closure according to embodiments of the invention.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Embodiments of the present invention are generally directed to a novel two-piece dispensing closure 10 for dispensing a measured dose of a flowable product from a squeeze type container 900.

Referring now to drawing FIGS. 1-16, an exemplary embodiment of the dispensing closure 10 for dispensing a fixed or adjustable volume or dose of flowable product from a squeeze container 900 (see FIG. 16) comprises a cup-shaped measuring chamber generally indicated at 12 and a rotatable dispensing control lid generally indicated at 14.

The measuring chamber 12 may be integrally molded from a plastic material as a single piece. The plastic material may also be an opaque colored material, or in some embodiments, the plastic material may be translucent or transparent so that the user may see dispensed product within the interior 16 of the measuring chamber 12 during use. The measuring chamber 12 may include markings 200 for identifying recommended measured doses (see also FIG. 16). For example, in some exemplary embodiments, markings 200 may be etched, laser etched, printed, or otherwise included on the measuring chamber 12 to assist a user with determining the amount of product within the interior 16 of the measuring chamber 12.

As seen in the illustrated exemplary embodiment, the measuring chamber 12 is cup-shaped and includes a bottom wall 18 and an outer peripheral side wall 20, a pour spout 22 formed in the side wall 20, a drain well 24 in the bottom wall 18, and a tubular dispensing stem 26 extending upward from the drain well 24. The bottom wall 18 may slope from the outer peripheral side wall 20 towards the tubular dispensing stem 26. The tubular dispensing stem 26 has a dispensing orifice 28 at an upper end thereof. The measuring chamber 12 further includes a dip tube receptacle 30 extending downwardly from the drain well 24, a guide wall 32 extending upward from the bottom wall 18 surrounding the drain well 24, and a plurality of drain ports 34 in the bottom of the drain well 24. Some embodiments may include one or more drain ports 34. The guide wall 32 includes opposing drain slots 36 extending from the bottom wall 18 upward. The slots 36 provide drain paths for the dispensed product to flow from the interior holding area 16 of the measuring chamber 12 into the drain well 24. Some embodiments may include one or more drain slots 36. A dip tube 38 is received in the dip tube receptacle 30 to draw product upward from the container. An inner threaded skirt wall 40 extends downward from the bottom wall 18 for attachment to a product container 900. The skirt wall 40 may alternatively include other securing structures to secure the measuring chamber to the product container neck. A sealing gasket 42 is located in annular gap between the drain well 24 and the attachment skirt wall 40. The measuring chamber 12 may further include an outer decorative skirt wall 44 sized and contoured to match the product container shape.

Figure 2:
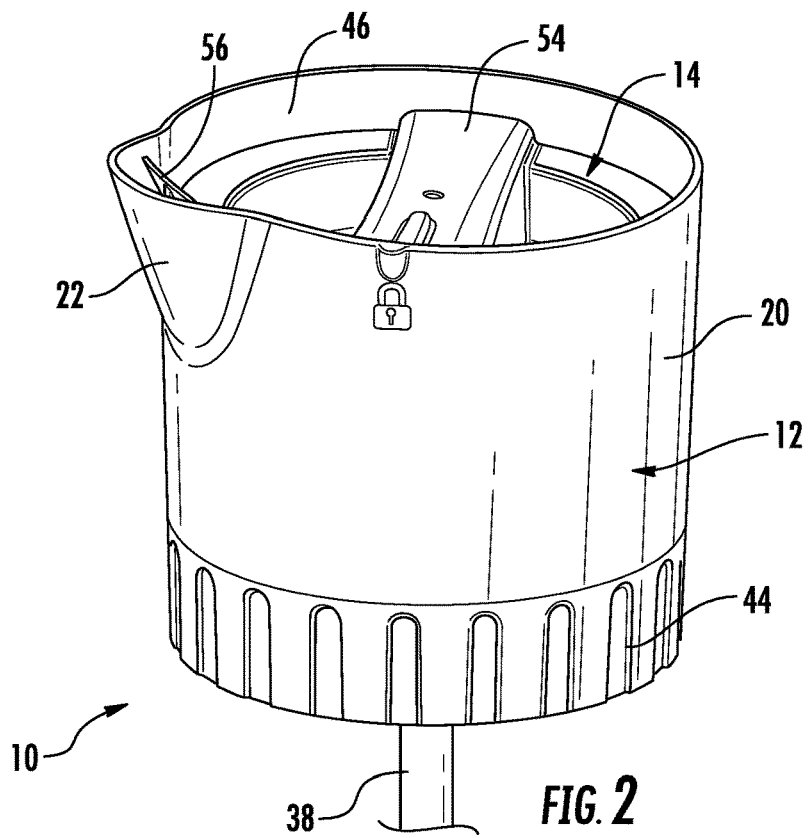
FIG. 2 is another perspective view thereof.
Figure 4:
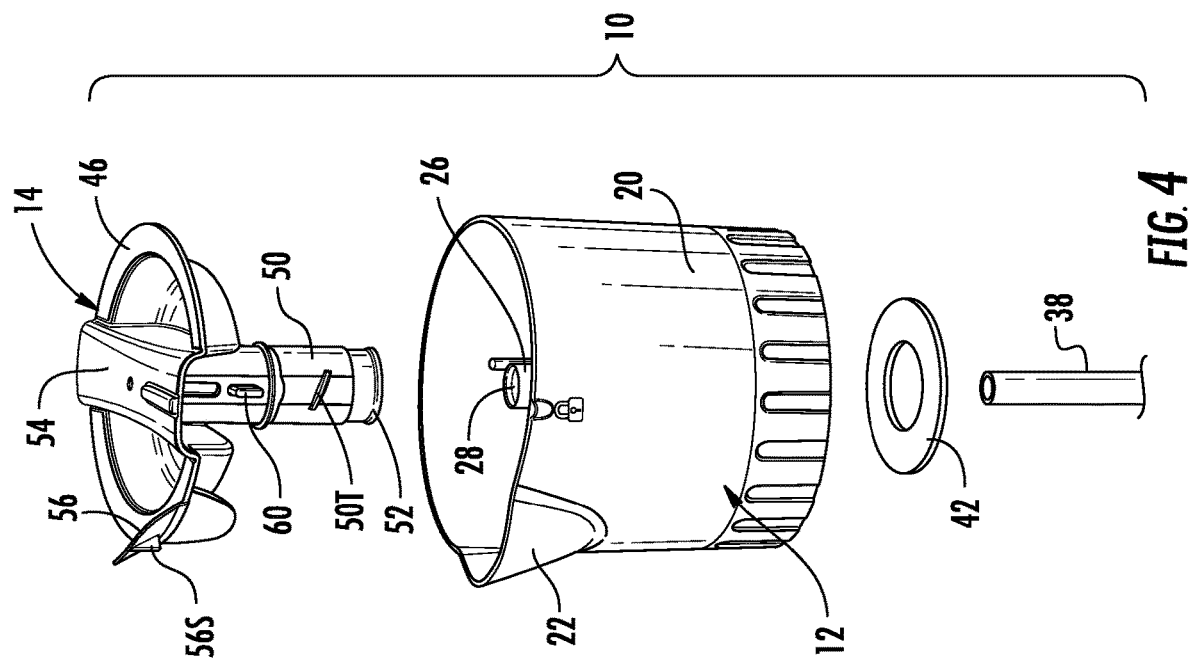
FIG. 4 is another exploded perspective view thereof.
Figure 3:
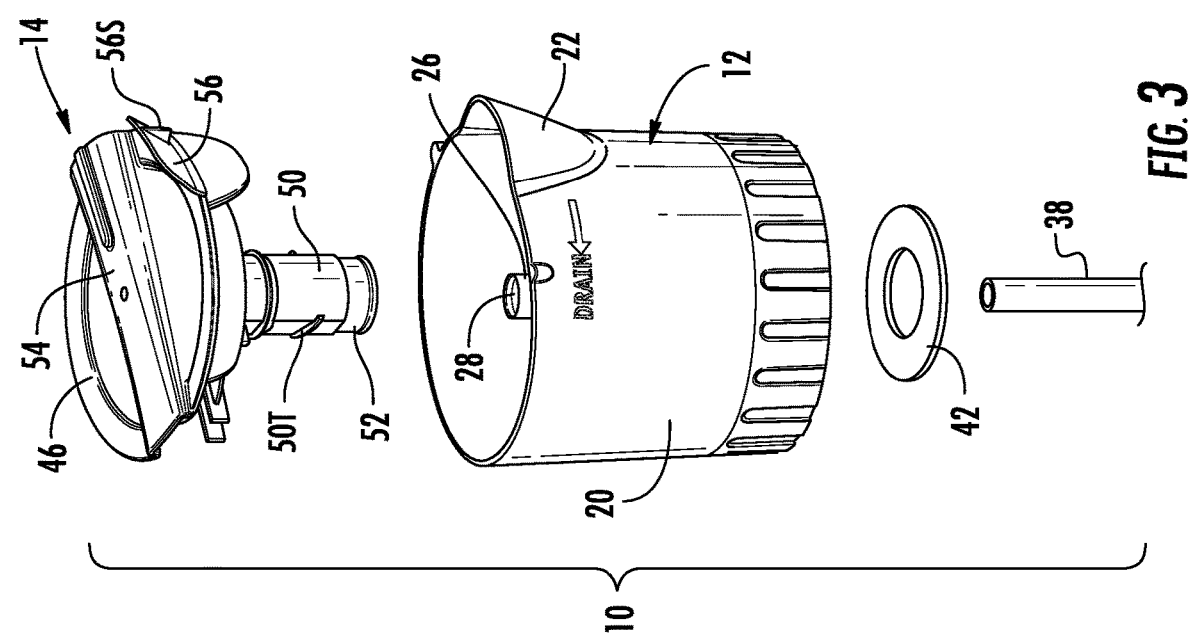
FIG. 3 is an exploded perspective view thereof.
Figure 5:
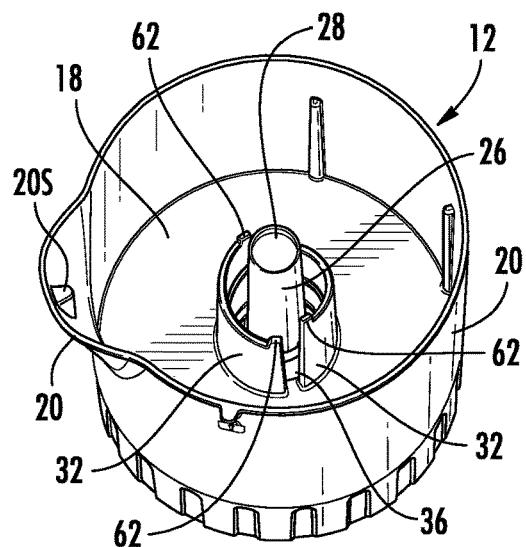
FIG. 5 is top perspective view of the closure body showing the measuring chamber.
Figure 6:
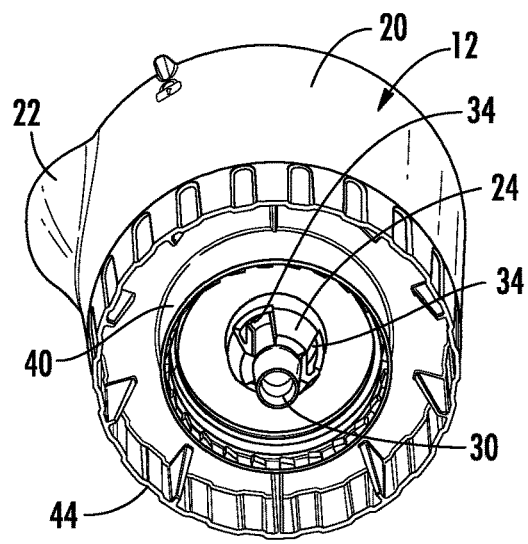
FIG. 6 is a bottom perspective view of the measuring chamber showing the drain well and dip tube receptacle.
Figure 7:
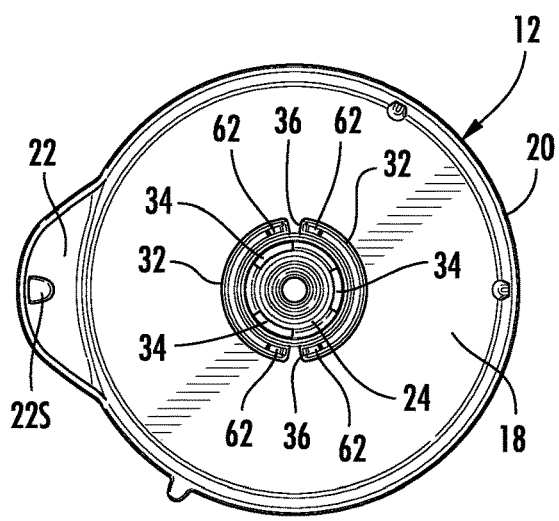
FIG. 7 is a top view of the measuring chamber.
Figure 8:
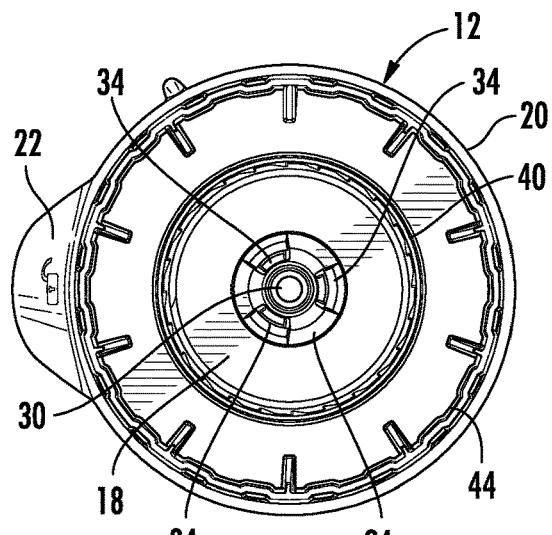
FIG. 8 is a bottom view of the measuring chamber.
Figure 9:
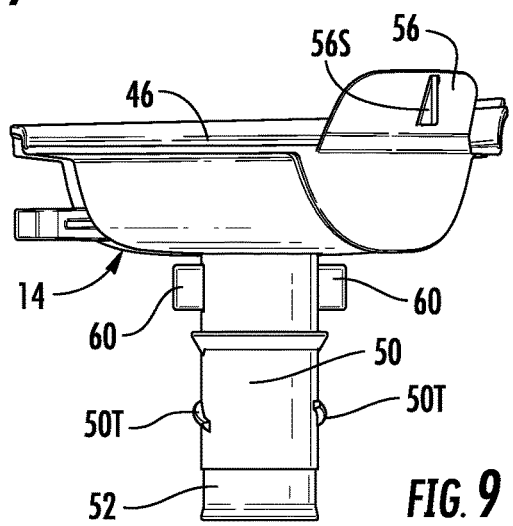
FIG. 9 is a perspective view of the dispensing control lid.

The dispensing control lid 14 may be integrally molded from a plastic material as a single piece. The dispensing control lid 14 includes a contoured upper wall 46, a sealing plug 48 extending down from the upper wall 46, a tubular guide stem 50 extending downwardly from the upper wall 46 surrounding the sealing plug 48, and an annular drain well seal 52 at a terminal lower end of the guide stem 50. As best seen in FIGS. 1 and 2, the upper wall 46 is contoured to include an actuator structure 54 which facilitates rotation of the control lid 14 during use.

The guide stem 50 and the guide wall 32 are cooperatively threaded and rotatably interact for guided axial movement of the dispensing control lid relative to the measuring chamber 12. In the exemplary embodiment, the guide wall 32 is inwardly threaded 32T while the guide stem 50 is outwardly threaded 50T. Other configurations are contemplated.

Figure 14:
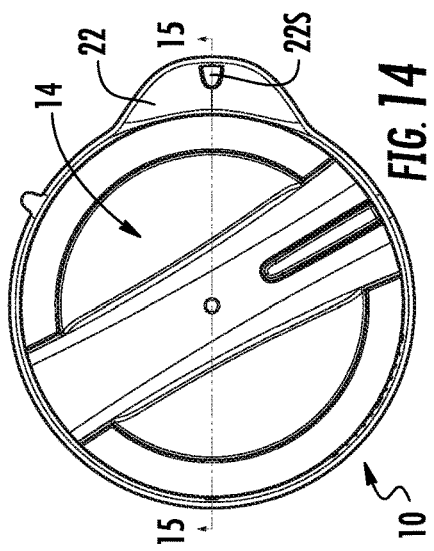
FIG. 14 is a top view of the measured dose dispensing closure with the dispensing control lid in a drain position.
Figure 15:
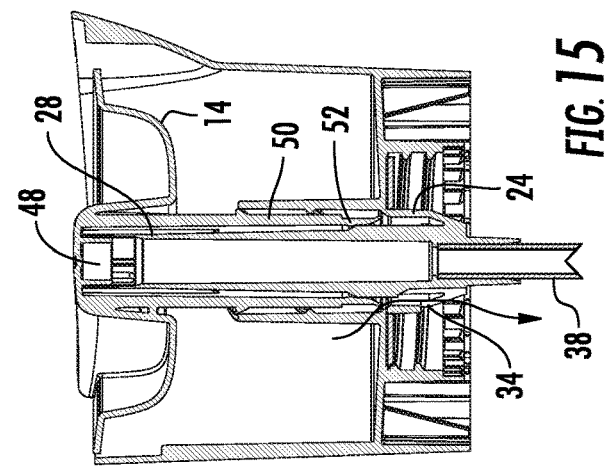
FIG. 15 is a cross-sectional view thereof taken along line 15-15 of FIG. 10.
Figure 16:
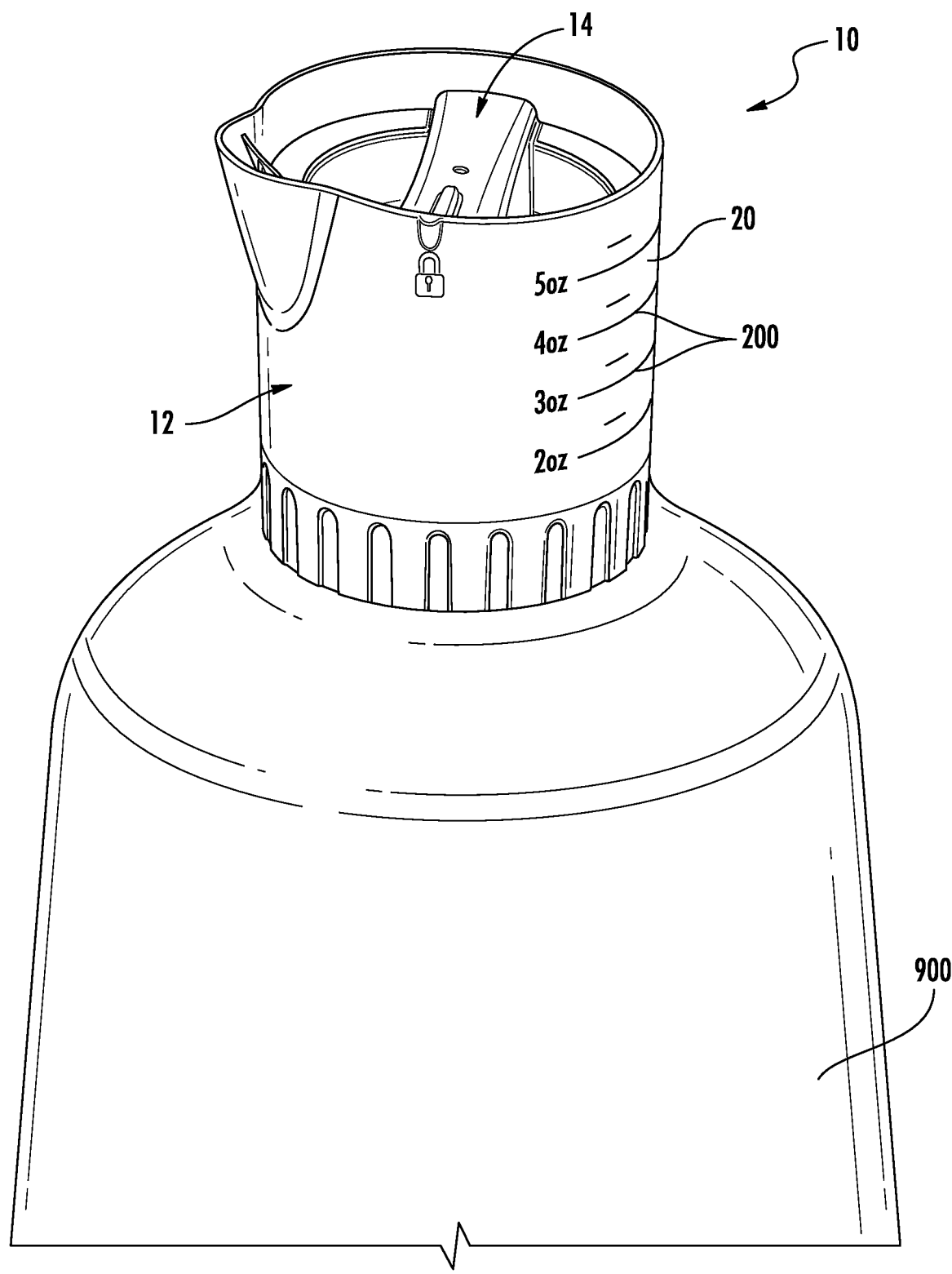
FIG. 16 is a perspective view of an exemplary configuration of a measured dose dispenser of the present invention attached to a container.

In use, the dispensing control lid 14 is axially moved relative to the measuring chamber 12 by rotation between a first closed position (FIGS. 1, 2, 10 and 11), a second intermediate dispensing position (FIGS. 12 and 13), and a third drain position (FIGS. 14 and 15).

In the closed position (FIGS. 10 and 11), the dispensing lid is fully rotated clockwise, down into the measuring chamber 12 where the sealing plug 48 is inserted into and closes the dispensing orifice 28 in the dispensing stem 26 and the drain well seal 52 is seated between the drain well wall 24 and the dispensing stem 26 to close the drain well 24.

In the intermediate dispensing or filling position (FIGS. 12 and 13), the dispensing control lid 14 is rotated counter-clockwise about 60 degrees where the sealing plug 48 is axially moved upward so that it is spaced from the dispensing orifice 28 for filling the measuring chamber 12. The drain well seal 52 is slightly axially longer so that is remains engaged with the drain well 24 and still closes the drain well 24. In this regard, when the product container is squeezed, product flows up through the clip tube 38 into the dispensing stem 26 and fills the measuring chamber 12. As noted above, the measuring chamber 12 may be transparent or translucent and can include measurement markings 200 so that the user can squeeze product until a desired dose is contained in the measuring chamber 12. The user may dispense the product by pouring from the pour spout 22.

In the drain position (FIGS. 14 and 15) the dispensing control lid 14 is rotated another 60 degrees counterclockwise, moving the drain well seal 52 further upward to disengage the drain well seal 52 from the drain well 24, allowing product to flow into the drain well 24, through the drain ports 34 and back into the product container 900.

While the rotation of about 60 degrees in a counterclockwise direction is illustrated to switch between the closed position, intermediate position, and drain position, it is understood that in other embodiments of the invention, the rotational distance may be varied, less-than, or more-than 60 degrees. In addition, rotation may be in a clockwise direction.

Figure 10:
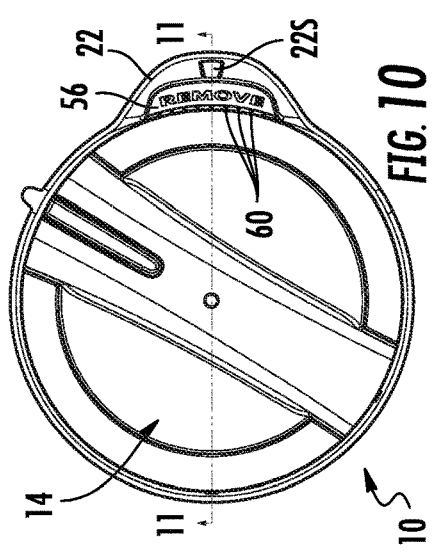
FIG. 10 is a top view of the measured dose dispensing closure with the dispensing control lid in a closed position.
Figure 11:
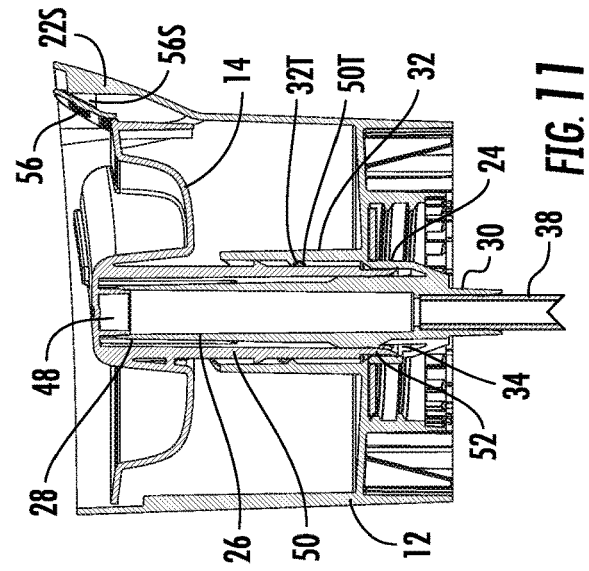
FIG. 11 is a cross-sectional view thereof taken along line 11-11 of FIG. 10.
Figure 12:
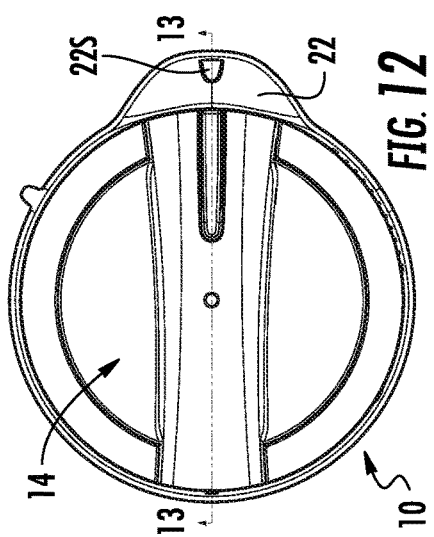
FIG. 12 is a top view of the measured dose dispensing closure with the dispensing control lid in a fill/measure and dispense position.
Figure 13:
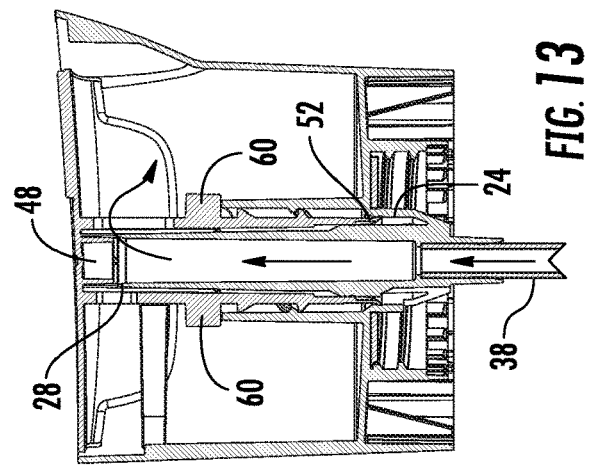
FIG. 13 is a cross-sectional view thereof taken along line 13-13 of FIG. 12.

In some embodiments, the dispensing closure 10 may include a tamper evident tab 56 connected to the lid by frangible elements 58. As best seen in FIG. 10, the tamper evident tab 56 is secured to the upper wall 46 of the control lid 14 so that it occupies the open area within the spout 22 while the control lid 14 is located in the fully closed position (initial shipping condition) (FIGS. 10 and 11). To facilitate breaking of the frangible elements 58, the inner surface of the spout 22 and the lower surface of the tab 56 include interacting shoulders 22S and 56S which, when the control lid is initially rotated, will force the tab 56 upward causing bending and braking of the frangible elements 58.

Still other embodiments may include rotation stops to locate the dispensing control lid 14 in the fully closed position and the fully open or drain position. Best seen in FIGS. 5 and 9, the rotation stops comprise opposing stop tabs 60 extending radially outward from the control lid guide stem 50 and corresponding stop shoulders 62 formed on the slotted guide wall 32. These structures will stop clockwise rotation of the dispensing control lid 14 in the fully closed position, and counterclockwise rotation in the fully open drain position.

Another exemplary embodiment of the dispensing closure may include a push-pull version where the dispensing control lid is axially slidable relative to the measuring chamber between the 3 different positions.

It can therefore be seen that the exemplary embodiments provide unique dispensing closures with are effective for dispensing an adjustable dose of product from a squeeze type container and for draining over filled product when not needed.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A dispensing closure comprising:
    a measuring chamber including;
        a drain well;
        a dispensing stem extending upward from said drain well;
        a guide wall surrounding said dispensing stem;
        a container attachment structure and
    a dispensing control lid including
        an upper wall;
        a sealing plug extending down from said upper wall;
        a guide stem extending downwardly from said upper wall surrounding said sealing plug;
        a drain well seal at a terminal end of said guide stem.

2. The dispensing closure of claim 1 wherein
said dispensing control lid is axially movable between
    a closed position wherein said sealing plug closes said dispensing stem and said drain well seal closes said drain well,
    a fill position wherein said sealing plug is spaced from said dispensing stem and said drain well seal still closes said drain; and
    a drain position wherein said sealing plug is spaced from said dispensing stem and said drain well seal is spaced from said drain well.

3. The dispensing closure of claim 1 further comprising a spout formed at an upper peripheral edge of an outer side wall of said measuring chamber.

4. The dispensing closure of claim 3, further comprising a tamper evident tab secured to said dispensing control lid with frangible elements, said tamper evident tab interacting with said spout.

5. The dispensing closure of claim 3 wherein said guide wall and said guide stem are cooperatively threaded.

6. The dispensing closure of claim 5 wherein said guide wall and said guide stem include cooperative stops for said closed position and said drain position.

7. The dispensing closure of claim 5, further comprising a tamper evident tab secured to said dispensing control lid with frangible elements, said tamper evident tab interacting with said spout.

8. The dispensing closure of claim 7 wherein said tamper evident tab and said spout include interacting shoulders which force movement of said tamper evident tab to sever said frangible elements upon an initial rotation of said dispensing control lid.

9. The dispensing closure of claim 1 wherein said upper wall of said dispensing control lid includes an actuator.

10. The dispensing closure of claim 1 wherein said measuring chamber is molded from a translucent or transparent plastic.

* * * * *